(12) United States Patent  (10) Patent No.: US 7,503,281 B2
Van Den Berg et al.  (45) Date of Patent: Mar. 17, 2009

(54) DEVICE FOR AND A METHOD OF AUTOMATICALLY SUPPLYING FEED AND/OR DRINK TO AN ANIMAL

(75) Inventors: Karel Van Den Berg, Bleskensgraaf (NL); Lucien Eliza Niels Voogd, Leerdam (NL); Howard Sie, Rotterdam (NL)

(73) Assignee: Lely Enterprises AG, Zug (CH)

( * ) Notice: Subject to any disclaimer, the term of this patent is extended or adjusted under 35 U.S.C. 154(b) by 406 days.

(21) Appl. No.: 11/287,216

(22) Filed: Nov. 28, 2005

(65) Prior Publication Data

US 2006/0112890 A1   Jun. 1, 2006

(30) Foreign Application Priority Data

Nov. 29, 2004   (NL) .................................. 1027615

(51) Int. Cl.
 *A01K 5/00*   (2006.01)
(52) U.S. Cl. ................................................. 119/51.02
(58) Field of Classification Search .............. 119/51.02, 119/51.12, 51.14, 59, 62, 63, 61.3, 51.01
See application file for complete search history.

(56) References Cited

U.S. PATENT DOCUMENTS 6,651,584 B2 * 11/2003 van den Berg ........... 119/51.02
2006/0130772 A1 * 6/2006 Mortensen .................. 119/240

* cited by examiner

*Primary Examiner*—T. Nguyen
(74) *Attorney, Agent, or Firm*—Howrey LLP; David P. Owen

(57) ABSTRACT

The invention relates to a device for automatically supplying feed and/or drink to an animal, comprising at any rate at least one trough, a flap, a control unit for controlling the flap, so that the flap is capable of being put in an open position and in a closed position for giving the animal access to the trough, respectively preventing the animal from having access to the trough, and an identification device for identifying the animal and for emitting an identification signal that is indicative of the identified animal. The control unit is provided with a memory, which memory is suitable for storing a first set of identification data in relation to animals that are allowed to have access to the trough and a second set of identification data in relation to animals that are not allowed to have access to the trough, with a comparing device for comparing the identification signal with the first and the second set of identification data in the memory, the control unit always keeping the flap in the open position or releasing the flap from the closed position if the identification signal belongs to the first set, and the control unit keeping the flap in the closed position or releasing the flap from the open position for enabling it to assume the closed position if the identification signal belongs to the second set.

19 Claims, 6 Drawing Sheets

DEVICE FOR AND A METHOD OF AUTOMATICALLY SUPPLYING FEED AND/OR DRINK TO AN ANIMAL

BACKGROUND OF THE INVENTION

1. Field of the Invention

The invention relates to devices for automatically supplying feed or drink to an animal. The invention further relates to methods of automatically supplying feed or drink to an animal in a trough

2. Description of the Related Art

Devices are known for automatically supplying feed to an animal in which the feed is provided in a trough. A device of this type is known from DE 8716831U1 which comprise a flap controlled by a control unit, which flap is capable of being put in an open position and in a closed position for giving the animal access to the trough, respectively preventing the animal from having access to the trough. In a standard situation the flap is in its closed position. Continuous energizing of an air cylinder connected to the flap realises a transition to the open position for an animal having access to the feed trough. After a certain period of time the flap is put again in the closed position by continuous energizing of the air cylinder. In such cases, the flap can be used for actively driving the head of an animal out of the feed trough. The device is provided with an identification device by which an animal may be identified. If an animal that is not authorized to feed approaches the feed trough, the flap will be kept in the closed position. Animals that are authorized to feed will also be confronted initially with a closed flap. This is not a logical signal for the animal that is eligible to eat and it may have an adverse effect on the feed consumption of the animal Thus, there is a particular need for a device for and a method of automatically supplying feed and/or drink to an animal, in which access to the feed trough is logical for an animal.

BRIEF SUMMARY OF THE INVENTION

According to the present invention, there is provided a device that attempts to overcome these shortcomings. The device comprises at least one trough, a closure, movable between an open position for giving the animal access to the trough, and a closed position preventing the animal from having access to the trough, an identification device for identifying the animal and for emitting an identification signal that is indicative of the identified animal; and a control unit controlling the closure, the control unit comprising a memory for storing a first set of identification data in relation to animals that are allowed to have access to the trough and a second set of identification data in relation to animals that are not allowed to have access to the trough, and a comparing device for comparing the identification signal with the first and the second set of identification data in the memory, the control unit always keeping the closure in the open position or releasing the closure from the closed position if the identification signal belongs to the first set, and the control unit keeping the closure in the closed position or releasing the closure from the open position for enabling it to assume the closed position if the identification signal belongs to the second set. Preferably, the closure is in the form of a flap. Other suitable forms of closure will be immediately evident to the skilled person and reference in the following to a flap is intended to include such other forms of closure.

The invention is based on the insight that, when the trough is immediately accessible during at least most of the time for an animal having access to the trough, the feed consumption is improved. Moreover, the device can be designed in a less complicated and cheaper way.

In an embodiment of a device according to the invention, the device comprises locking devices for locking the flap in at least an open or a closed position. During at least most of the time the flap is in the locked open position. This is a logical inviting signal for an animal that is eligible to eat. The locked position of the flap in the closed position prevents an animal that is not eligible to eat from having access to the trough.

In a preferred embodiment of a device according to the invention, the locking devices are suitable for locking or blocking the movement of the flap at least in one intermediate position between the open and the closed position. This prevents an animal that is not (or no longer) eligible to eat from being able to push the flap from the closed position back into the fully open position.

In a further preferred embodiment of a device according to the invention, the control unit is suitable for controlling the locking devices for unlocking the flap. After unlocking, the flap is capable of being pushed by the animal from the closed position into the open position. In reverse order, for enabling the flap to assume the closed position, it is required that the locking devices are unlocked in the open position.

In another preferred embodiment of a device according to the invention, the flap is rotatable about an at least substantially horizontal axis, the flap being upwardly pivotable from the closed position to the open position. Efficient use is thereby made of the gravitational force acting on the flap for enabling the flap to switch quickly from the open position into the closed position.

In a yet further preferred embodiment of a device according to the invention, the device comprises at least one indication means for the animal with regard to preventing access or giving access to the trough. Thus it is indicated to the animal whether or not the trough is accessible.

The invention also relates to a method of automatically supplying feed and/or drink to an animal in a trough, the method comprising controlling a flap for giving access to the trough in the open position, respectively for preventing access to the trough in the closed position, identifying the animal and emitting an identification signal that is indicative of the identified animal. The method further comprises comparing the identification signal with a first and a second set of identification data, the first set of identification data relating to animals that are allowed to have access to the trough and the second set of identification data relating to animals that are not allowed to have access to the trough, and keeping the flap in the open position or releasing the flap from the closed position if the identification signal belongs to the first set, and keeping the flap in the closed position or releasing the flap from the open position for enabling it to assume the closed position if the identification signal belongs to the second set.

Preferably, the method comprises locking the flap in at least an open position or in a closed position. In this manner, it is not necessary to actively maintain the flap in its given position.

More preferably, the method comprises controlling the locking device for unlocking the flap.

According to a further preferred embodiment the method comprises pivoting the flap upwards from the closed position to the open position about a substantially horizontal axis.

According to a yet further preferred embodiment the method comprises giving the animal at least one indication with regard to preventing access or giving access to the trough. Such an indication may be given in the form of light or sound or the like.

According to another aspect of the invention there is also provided a device for controlling access to a feed trough, comprising a flap having an open position for giving an animal access to the trough and a closed position preventing an animal from having access to the trough, the flap being biased to the closed position a locking device comprising a first lock for locking the flap in the open position, an identification device for identifying an animal that is not authorized to feed and for emitting a first signal, and a control unit responsive to the first signal to release the first lock such that the flap can move to the closed position.

In one alternative, the locking device also comprises a second lock for locking the flap in the closed position.

In a further alternative, the identification device identifies animals that are authorized to feed and emits a second signal and wherein the control unit is responsive to the second signal to release the second lock.

Preferably, the flap is moveable by the animal from the closed position to the open position on release of the second lock. In this manner, there is no requirement of a separate actuator for movement of the flap to the open position.

In another embodiment, the flap may have an intermediate position between the open position and the closed position and the device further comprises a third lock, the third lock preventing movement of the flap from the intermediate position towards the open position. The third lock may assist in preventing an animal for pushing back the flap once it has started to move to the closed position. A number of third locks at other intermediate positions may be provided should this be desired.

In a preferred embodiment, the locking device comprises an elongate slot and a pin moveable in the slot and the first lock comprises a first notch adjacent a first end of the slot. The slot may be provided on a member connected to the flap while the pin may be fixed to the surrounding structure. A kinematic reversal of this arrangement is equally possible. Preferably, the second lock comprises a second notch adjacent a second end of the slot.

In a further preferred embodiment, the control device acts on the locking device to move it in a direction generally perpendicular to the slot. In this manner, the force exerted by the control device on the locking device need not be high in order to achieve locking and unlocking. Conversely, transfer of forces exerted by the animal on the locking device may be minimised.

Preferably, the flap is biased to the closed position by its own weight under the force of gravity. It is however also possible that other forms of bias may be used, such as springs.

The device and method as described according to the invention may be particularly adapted and sized for use by cows or other similar dairy animals. Nevertheless, it is understood that the present invention is not limited in this respect.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
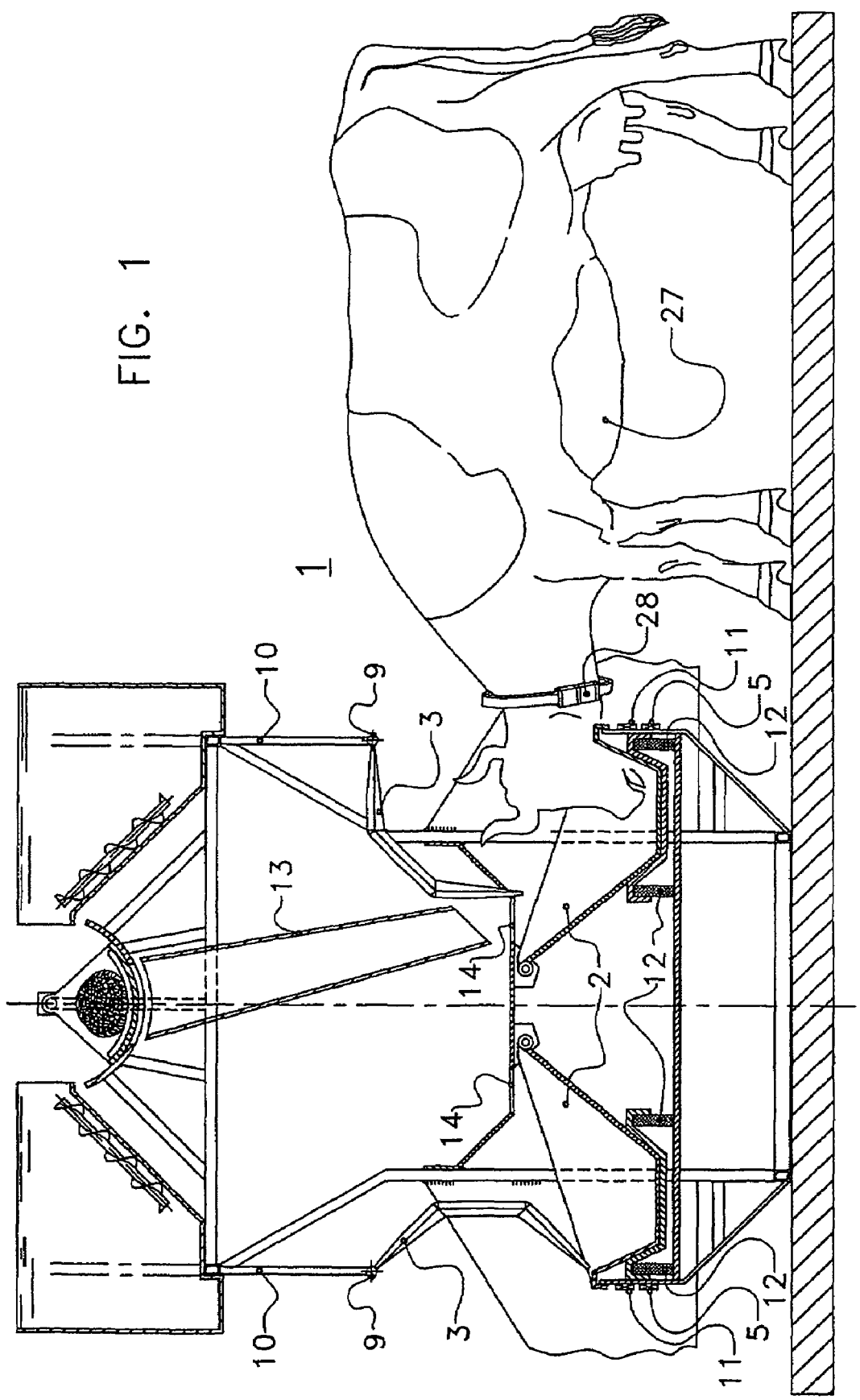
FIG. 1 shows a cross-sectional view of a system for automatically supplying feed and/or drink to an animal, comprising an embodiment of a device according to the invention.

FIG. 1 shows a cross-sectional view of a feeding column 10 for automatically supplying feed and/or drink to an animal 27 with several feed troughs disposed around a central axis, each comprising a flap 3 that is capable of being pushed away. In the figure, on the left, the flap 3 of a feed trough is depicted in the closed position; on the right the flap 3 of another feed trough is shown in the opened position. In the opened position the flap 3 constitutes the rear and upper wall of the device 1. The dimensions of the feed trough 2 are so large that the animal 27 is able to root up the feed freely without feed falling over the edges beside the feed trough 2. The feed trough 2 is provided with a weighing sensor 12. The feed trough 2 is filled at its rear side via the central feed distribution tube 13 of the feeding column 10. The aperture 14 between the rear wall of the feed trough 2 and the rear side of the flap 3 that is capable of being pushed away is sufficiently large for the supply of feed or drink. The rear wall of the feed trough 2 and the rear side of the flap 3 that is capable of being pushed away form together a funnel-shaped guide means for the feed and/or the drink. In the unlikely event of feed getting stuck between the rear side of the flap 3 and the feed trough 2, upon rotation of the flap 3 from the opened position into the closed position, the blocked feed will still get into the feed trough 2. Because of the large set-up of the entire device in the zone of the feed trough 2 there is a good ventilation. Air freshening in the vicinity of the head of, for example, a cow is important. The risk of condensation and consequently fungoid growth and caking of feed in the feed trough 2 is now minimized. The animal 27 is stimulated to eat by the now always freshly smelling feed. In this embodiment, the feeding column 10 comprises several feed troughs 2 that are arranged circularly. The device 1 comprises a light unit 11 serving as an indication means for the animal 27 in relation to preventing access or giving access to the trough 2. Other indication means, such as, for example, a sound source, are possible as well.

Figure 2:
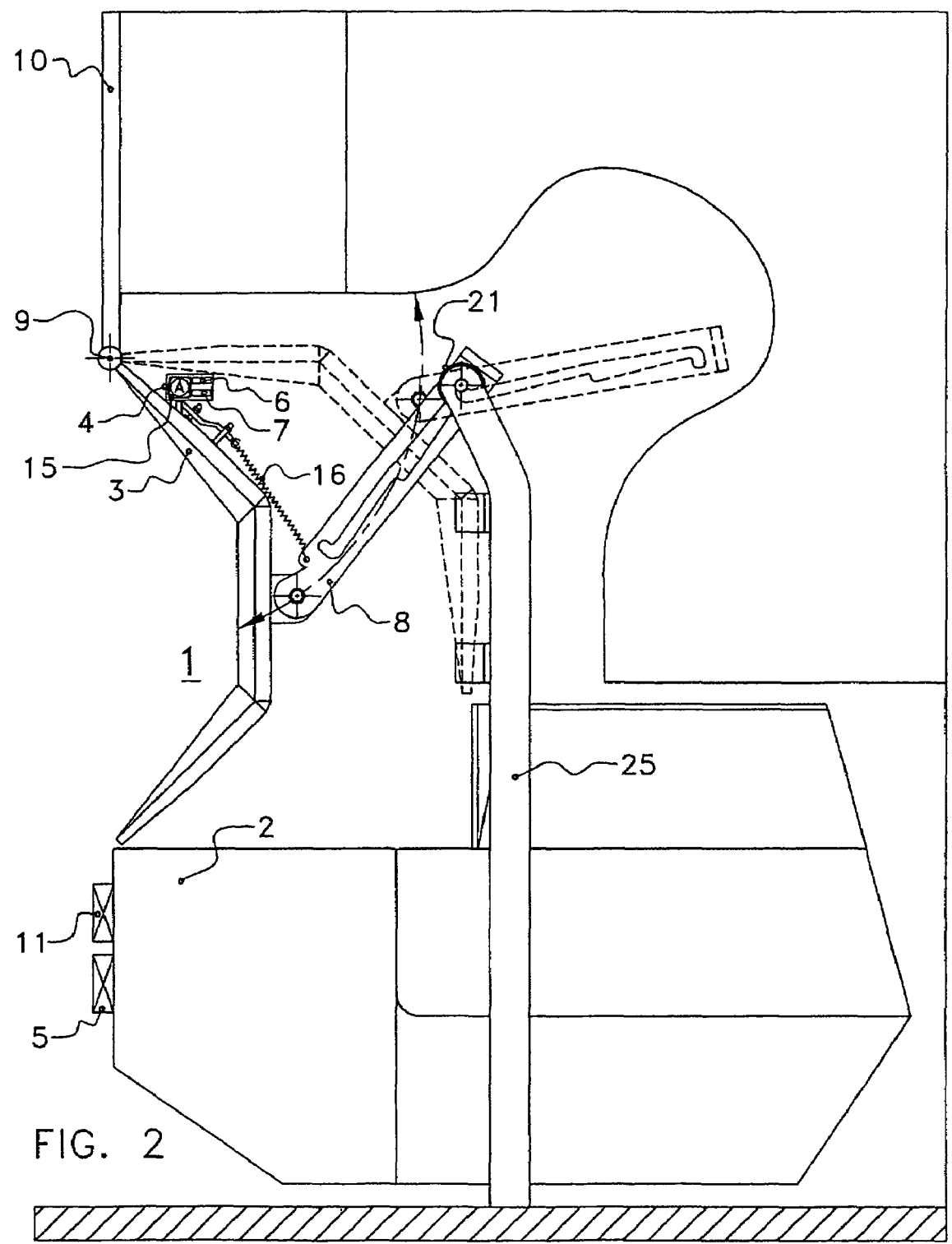
FIG. 2 shows in more detail an embodiment of a device according to the invention in a system according to FIG. 1.

FIG. 2 shows in more detail the device 1 according to the invention for automatically supplying feed and/or drink to an animal 27. As shown in FIG. 2, the device comprises a control unit 4 for controlling the flap 3, so that the flap 3 is capable of being put in an open position and in a closed position for giving the animal 27 access to the trough 2, respectively preventing the animal 27 from having access to the trough 2, and an identification device 5 for identifying the animal 27 and for emitting an identification signal that is indicative of the identified animal 27. The animal 27 wears an animal identification device 28 that is capable of communicating with the identification device 5 of the device 1. The control unit 4 is provided with a memory 6, which memory is suitable for storing a first set of identification data in relation to animals 27 that are allowed to have access to the trough 2 and a second set of identification data in relation to animals 27 that are not allowed to have access to the trough 2. A comparing device 7, constituting part of the control unit 4, compares the identification signal of the animal 27 with the first and the second set of identification data in the memory 6, the situation being such that, if the identification signal belongs to the first set, the control unit 4 always keeps the flap 3 in the open position or releases it from the closed position, and, if the identification signal belongs to the second set, the control unit keeps the flap 3 in the closed position or releases it from the open position for enabling it to assume the closed position.

Based on the identification signal of the relevant animal 27, in case of an animal 27 that is eligible to eat, feed and/or drink are/is brought into the feed trough 2 by means of a central feed distribution tube 13 of the feeding column 10. By means of calming light and/or sound signals in the immediate vicinity of the feed trough 2 during the time the animal 27 is eating, it is possible further to minimize stress in the animal's eating environment. The feed trough 2 and/or the feeding column 10 may further be provided with a spraying installation for (automatically) rinsing the feed trough 2 (not shown).

Figure 3:
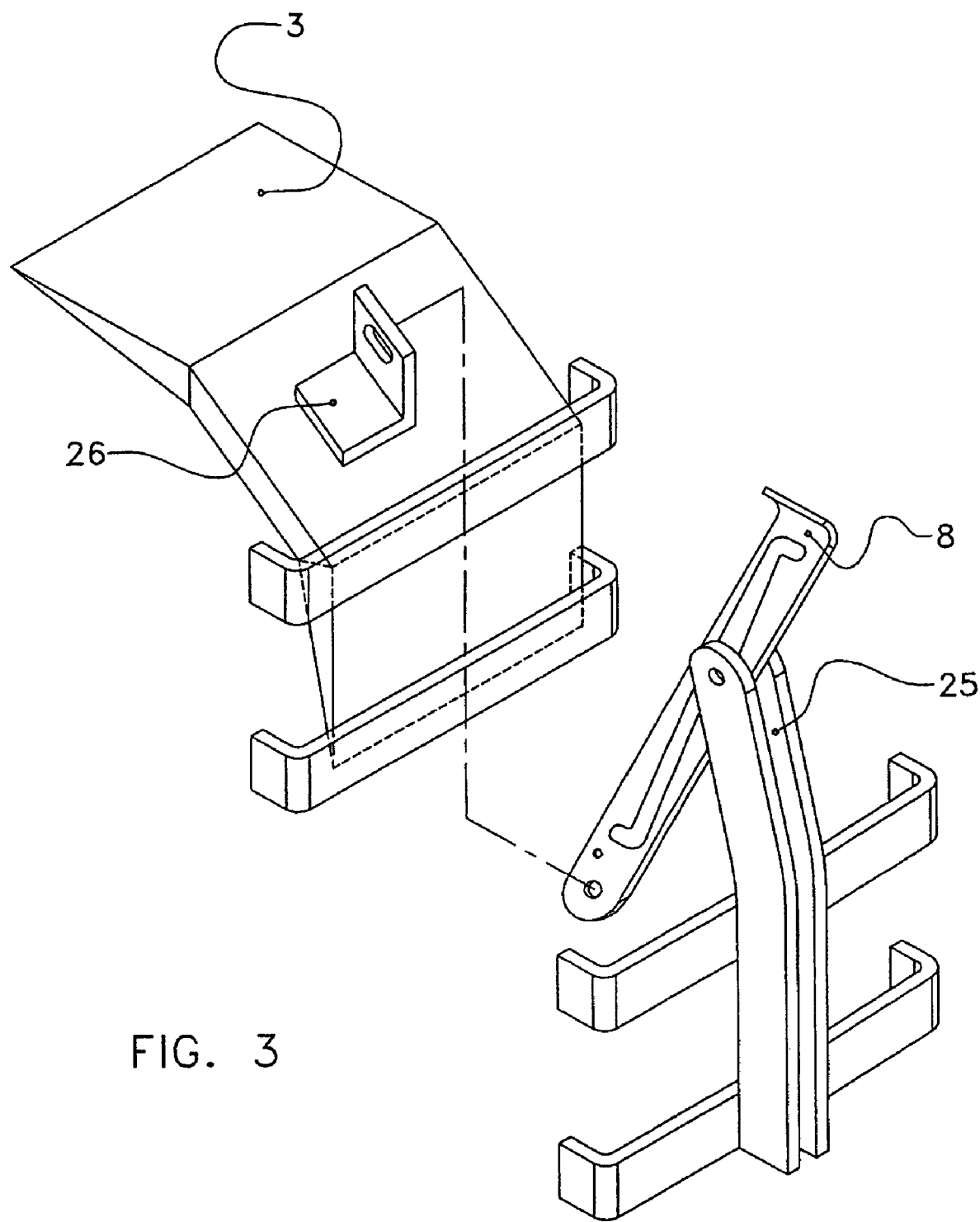
FIG. 3 shows an embodiment of the flap that is capable of being pushed away with a locking device to be used in an embodiment of a device according to the invention.

FIG. 3 shows a perspective view of the flap 3 that is capable of being pushed away and the locking device 8. In this embodiment, the flap 3 consists of a metal strip which is folded at the edges for obtaining a sufficient constructive strength. At the upper and rear side of the flap 3 there is a coupling point 26 for the locking device 8. The various components are interconnected by means of bolt connections (not explicitly shown). The flap 3 may be included in the feeding column 10 in such a way that in the closed position the lower edge of the flap 3 and the feeding column 10 do not entirely fit up, a gap remaining between the two elements. This makes it possible for the animal 27 to observe, when the flap 3 is in its closed position, whether it will be possible to consume feed and/or drink. The flap 3 may also be designed in a transparent or partially open structure (for example a grid structure). Besides, there is, of course, neither a limitation as regards the flap materials to be applied: synthetic materials, composite materials are only a few examples of the many other possibilities.

Figure 4:
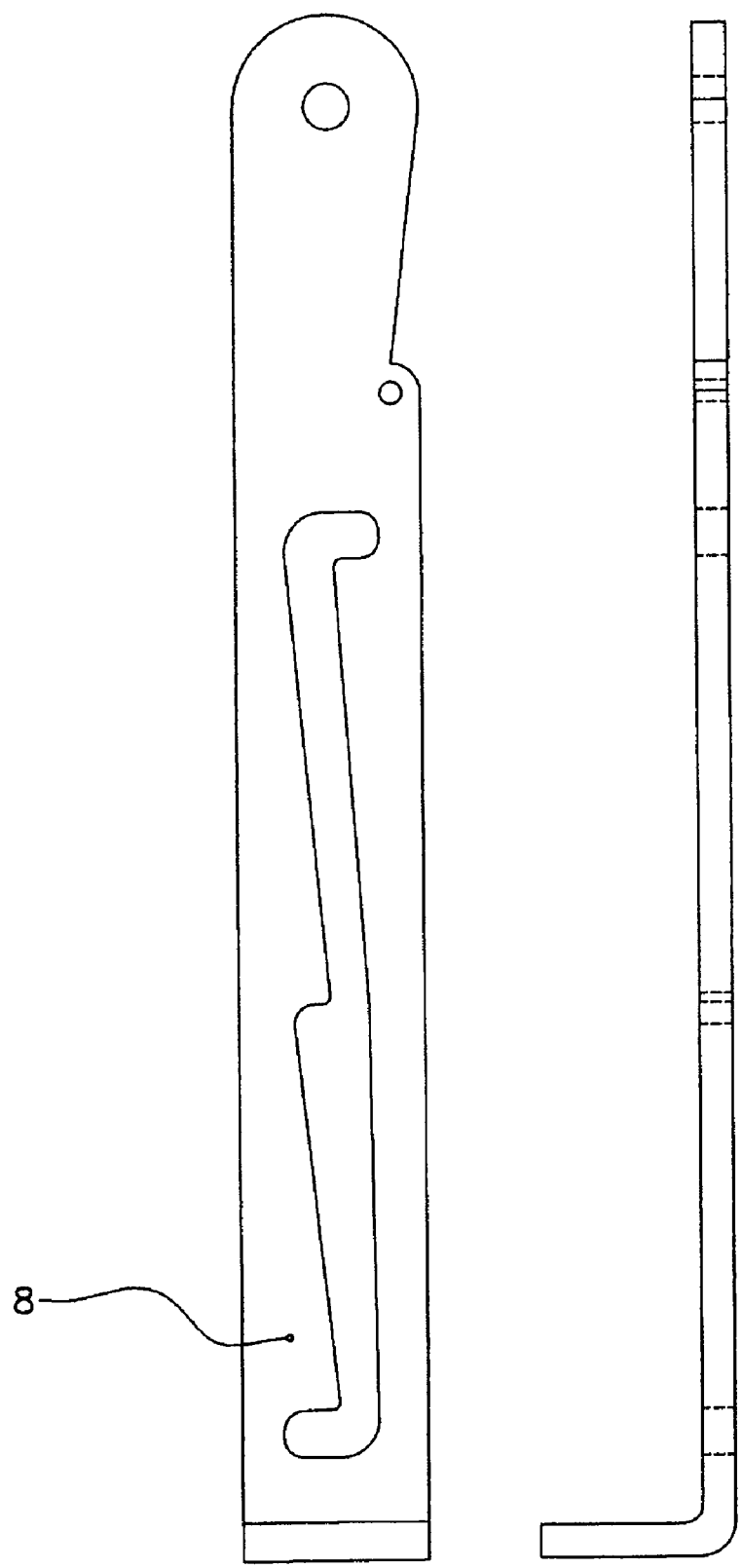
FIG. 4 shows in more detail the locking device of FIG. 3.

FIG. 4 shows a possible locking device 8 in more detail. With the aid of said locking device 8 and a pin 19 (FIG. 5) as a partner locking device, the flap 3 is capable of being locked at least in an open or a closed position and suitable for blocking an upwardly pivotable movement of the flap 3 in at least one intermediate position between the open and the closed position. The control unit 4 is suitable for controlling the locking device 8 for unlocking the flap 3. Said flap 3 is rotatable about an at least substantially horizontal axis 9, and is upwardly pivotable from the closed position to the open position. The connection between the feeding column 10 and the flap 3 may be realised by means of a flexible element.

The functioning of the device 1 is now explained with reference to FIG. 5.

FIG. 5A

Figure 5A:
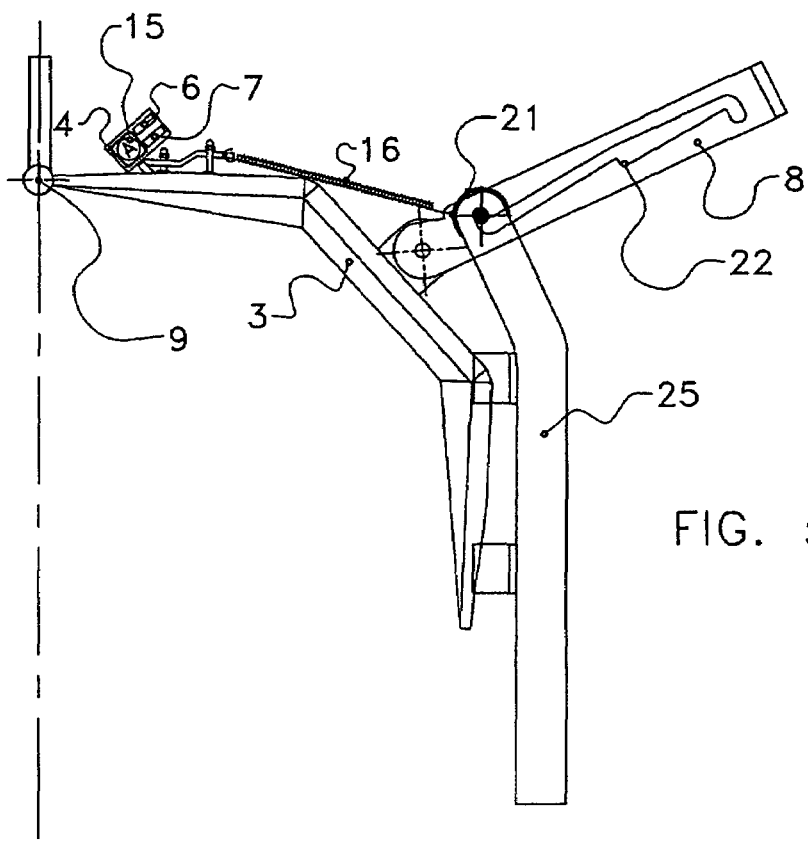
FIG. 5 shows schematically in side view a device according to the invention for elucidating its functioning.
Figure 5B:
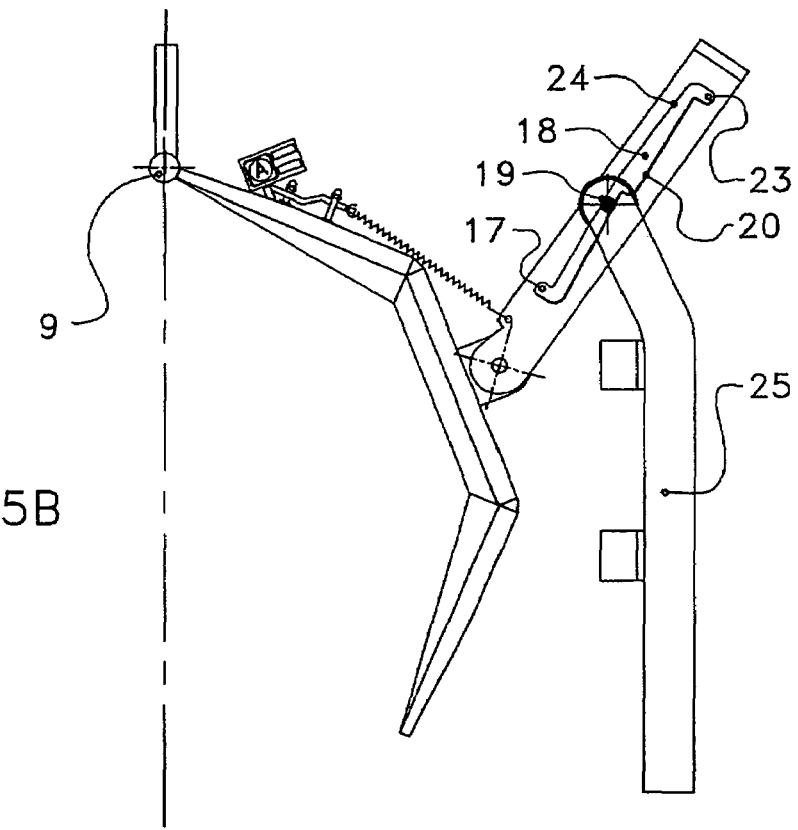

FIG. 5A shows schematically the position of the flap 3 in the open position. In this position, a spring 16 between an actuator 15 and a locking device 8 is in a condition of relatively low tension. Because of the situation of the centre of gravity of the locking device 8, the flap 3 is locked in this position under the influence of gravitational force: a notch 17 at one end of a slot 18 in the locking device 8 surrounds a pin 19.

FIG. 5B

If an animal 27 approaching the feed trough 2 is not eligible to eat or when an eating animal 27 has to leave its eating place, the actuator 15 is activated by the control unit 4. The actuator 15, in this example an electric motor, switches from a first position to a second position. In this case, the spring 16 is brought into a condition of high tension. This results in that the notch 17 comes loose from the pin 19 that was surrounded until that moment, so that the locking device 8 comes free. The flap 3 now falls downwards under the influence of gravitational force. The spring 16 put under tension ensures that the lower slot line 20 is kept in contact with the pin 19. A damping device 21, for example a rubber ring, is disposed around the pin 19, so that at the end of the free fall the locking device 8 can engage the pin 19 in a damped manner. This system is a fast functioning system. This makes it possible quickly to close the flap 3, so that an animal can no longer consume feed and/or drink, which is in particular advantageous in view of the jostling behaviour of dominant animals 27. Besides, due to the described method of closing, the aforementioned device 1 is very reliable. A continuous wireless signal connection between an animal identification device 28 worn by the animal 27 and the identification device 5 of the device 1 is not necessary. An animal identification signal received once and, consequently, activating once the actuator 15 will suffice for closing the flap 3. A notch 22 in the slot 18 of the locking device 8, between notches (17, 23) present at the ends of the locking slot 18, prevents an animal 27 that is not eligible to eat from succeeding in pushing the flap 3 into its completely open position. The upward movement of the flap is blocked at the moment when the notch 22 is able to surround the pin 19 halfway the locking slot 18. The arrangement is such that the animal 27 cannot get at the feed and/or the drink in this position of the flap 3. Of course, more or other ways of blocking the locking device 8 may be taken into consideration. As an actuator 15, besides the already mentioned electric motor, many other possibilities may be taken into consideration: an electromagnet, for example, may be chosen as well. Actuator 15, memory 6, comparing device 7 and control unit 4 may be separate, interconnected components. Also the positions of the aforementioned components may differ from the situation shown in FIGS. 2 and 5.

FIG. 5C

Figure 5C:
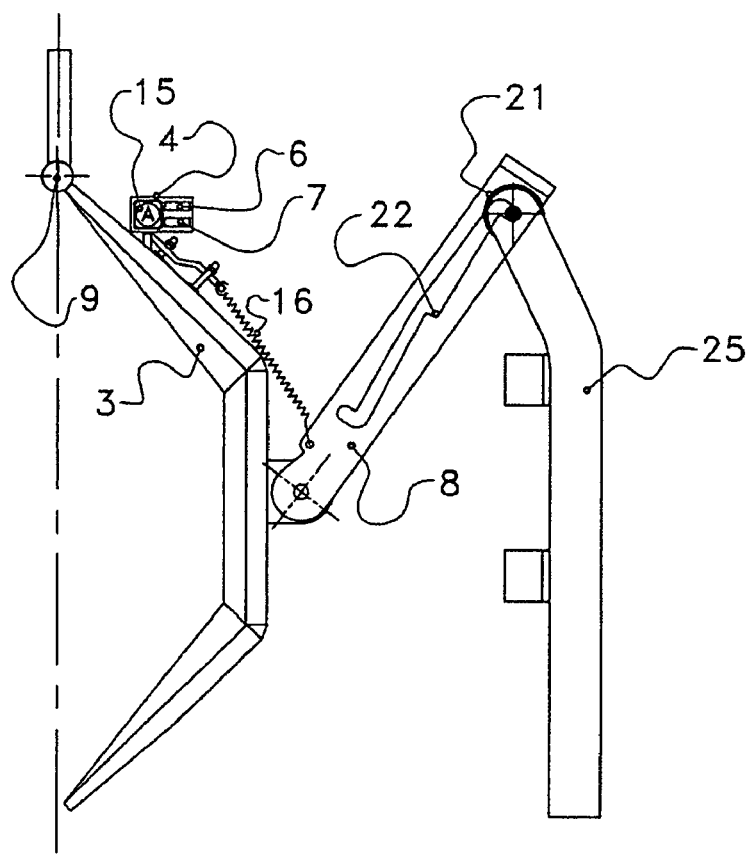
Figure 5D:
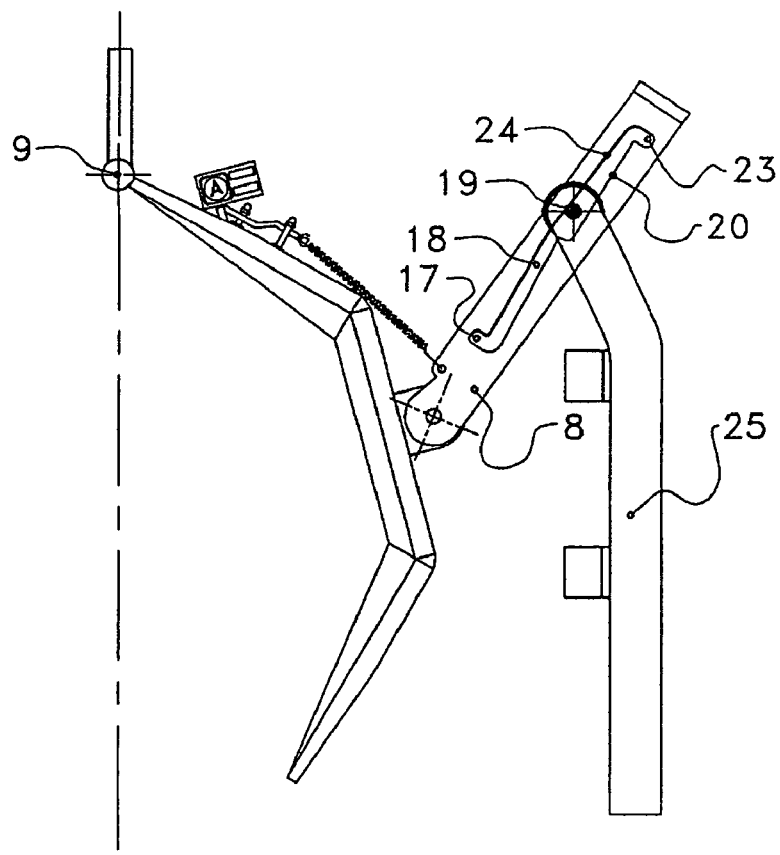

FIG. 5C shows schematically the position of the flap 3 in the closed position. In this position, a spring 16 between an actuator 15 and a locking device 8 is in a condition of high tension. By spring force a notch 23 at one end of a slot 18 in the locking device 8 is drawn to a pin 19 so as to surround said pin. Under the influence of spring force the flap 3 is now locked in this position.

FIG. 5D

In case an animal 27 that is eligible to eat approaches the feed trough 2 and the flap 3 is in its closed position, the actuator 15 is activated by the control unit 4. The actuator IS switches from a second position back to a first position. This means that the spring 16 is brought from a condition of high tension into a condition of low tension. The animal 27 pushing its nose against the flap 3 now results in that the notch 23 comes loose from the pin 19 that was surrounded until that moment, so that the locking device 8 comes free. Now the flap 3 is capable of being pushed away in upward direction by the animal 27. The upper slot line 24 keeps contact with the pin 19. Eventually the notch 17 will come into a position in which it surrounds the pin 19. The flap 3 is then in a locked open position.

In respect of the foregoing extra attention is drawn to the fact that the actuator 15 which operates the flap 3 is not capable of being loaded directly by an animal, this in contrast with the air cylinder applied in the device of DE 8716831U1. Consequently, the actuator 15 and the supporting frame 25 are loaded to a lesser extent. Furthermore, the device does not require complicated and/or expensive device-supporting provisions, which would be the case with an air cylinder being applied as an actuator for operating the flap. In a device 1 according to the invention, the locking device 8 is capable of being loaded by an animal. This relatively cheap component can easily be replaced.

Thus, the invention has been described by reference to certain embodiments discussed above. It will be recognized that these embodiments are susceptible to various modifications and alternative forms well known to those of skill in the art. Many modifications in addition to those described above may be made to the structures and techniques described herein without departing from the spirit and scope of the invention.

What is claimed is:

1. A device for automatically supplying feed or drink to an animal, comprising:
   at least one trough;
   a closure, movable between an open position for giving the animal access to the trough, and a closed position preventing the animal from having access to the trough;
   an identification device for identifying the animal and for emitting an identification signal that is indicative of the identified animal; and
   a control unit controlling the closure, the control unit comprising a memory for storing a first set of identification data in relation to animals that are allowed to have access to the trough and a second set of identification data in relation to animals that are not allowed to have access to the trough, and a comparing device for comparing the identification signal with the first and the second set of identification data in the memory, the control unit operating to:
   i. keep the closure in the open position if the identification signal belongs to the first set and the closure is in the open position;
   ii. release the closure from the closed position if the identification signal belongs to the first set and the closure is in the closed position;
   iii. keep the closure in the closed position if the identification signal belongs to the second set and the closure is in the closed position; and
   iv release the closure from the open position for enabling it to assume the closed position if the identification signal belongs to the second set and the closure is in the open position,
   wherein the device comprises a locking device connected to the closure, the locking device comprising an elongated slot interacting with a pin, the device further comprising an actuator arranged to act on the locking device to move the locking device in a direction generally perpendicular to the slot in order to respectively lock or unlock the locking device.

2. The device as claimed in claim 1, wherein the locking device is arranged to lock the closure at least in an open or a closed position.

3. The device as claimed in claim 2, wherein the control unit controls the locking devices for unlocking the closure.

4. The device as claimed in claim 1, wherein the closure is a flap rotatable about an at least substantially horizontal axis, the flap being upwardly pivotable from the closed position to the open position.

5. The device as claimed in claim 1, wherein the device comprises at least one indicator for the animal with regard to preventing access or giving access to the trough.

6. A method of automatically supplying feed or drink to an animal in a trough having a closure, wherein a locking device is connected to the closure, the locking device comprising an elongated slot interacting with a pin, an actuator being arranged to act on the locking device to move the locking device in a direction generally perpendicular to the slot in order to respectively lock or unlock the locking device, the method comprising:
   controlling the closure by acting on the locking device for giving access to the trough in an open position of the closure and for preventing access to the trough in a closed position of the closure;
   identifying the animal and emitting an identification signal that is indicative of the identified animal;
   comparing the identification signal with a first and a second set of identification data, the first set of identification data relating to animals that are allowed to have access to the trough and the second set of identification data relating to animals that are not allowed to have access to the trough; and
   based on the comparison;
   i. keeping the closure in the open position if the identification signal belongs to the first set and the closure is in the open position;
   ii. releasing the closure from the closed position if the identification signal belongs to the first set and the closure is in the closed position;
   iii. keeping the closure in the closed position if the identification signal belongs to the second set and the closure is in the closed position; and
   iv releasing the closure from the open position for enabling it to assume the closed position if the identification signal belongs to the second set and the closure is in the open position.

7. The method as claimed in claim 6, wherein the method comprises locking the closure in at least an open position or a closed position.

8. The method as claimed in claim 7, wherein the method comprises controlling the locking device for unlocking the closure.

9. The method as claimed in claim 6, wherein the closure comprises a flap and the method comprises pivoting the flap upwards from the closed position to the open position about a substantially horizontal axis.

10. The method as claimed in claim 6, wherein the method comprises giving the animal at least one indication with regard to preventing access or giving access to the trough.

11. A device for controlling access to a feed trough, comprising:
    a closure having an open position for giving an animal access to the trough and a closed position preventing an animal from having access to the trough, the closure being biased to the closed position;
    a locking device comprising a first lock for locking the closure in the open position, the locking device comprising an elongated slot for interacting with a pin;
    an actuator arranged to act on the locking device to move the locking device in a direction generally perpendicular to the slot in order to respectively lock or unlock the locking device;
    an identification device for identifying an animal that is not authorised to feed and for emitting a first signal; and
    a control unit responsive to the first signal to release the first lock such that the closure can move to the closed position.

12. The device according to claim 11, wherein the identification device further identifies animals that are authorised to feed and emits a second signal and wherein the control unit is responsive to the second signal to release the second lock.

13. The device according to claim 12, wherein the closure is moveable by the animal from the closed position to the open position on release of the second lock.

14. The device according to claim 11, wherein the first lock comprises a first notch adjacent a first end of the slot.

15. The device according to claim 11, wherein the second lock comprises a second notch adjacent a second end of the slot.

16. The device according to claim 11, wherein the closure is a pivotal flap, biased to the closed position by its own weight.

17. The device according to claim 11, wherein the animal is a dairy animal.

18. The device according to claim 17, wherein the dairy animal is a cow.

19. The device according to claim 18, wherein the closure is movable to the open position by the cow.

* * * * *